P. CHALLIS.
PISTON RING.
APPLICATION FILED SEPT. 28, 1918.

1,370,877.

Patented Mar. 8, 1921.

Witnesses.
E. W. Bayly
W. Bayly

Inventor:
Philip Challis,
per John Pitt Bayly,
Attorney.

UNITED STATES PATENT OFFICE.

PHILIP CHALLIS, OF KINGSWOOD, ENGLAND.

PISTON-RING.

1,370,877.        Specification of Letters Patent.        Patented Mar. 8, 1921.

Application filed September 28, 1918. Serial No. 256,104.

*To all whom it may concern:*

Be it known that I, PHILIP CHALLIS, a subject of the King of Great Britain, residing at "Beechwood," Kingswood, in the county of Surrey, in England, have invented a new and useful Improvement in and Relating to Piston-Rings, of which the following is a specification.

The invention has reference to piston rings for steam engines, internal combustion engines, pump plungers and the like. It has for object to obtain a better-wearing piston-ring and one which will better project from the piston and be continually forced outwardly against the cylinder wall.

I attain these objects by the mechanism illustrated in the accompanying drawing, in which—

Figure 1:
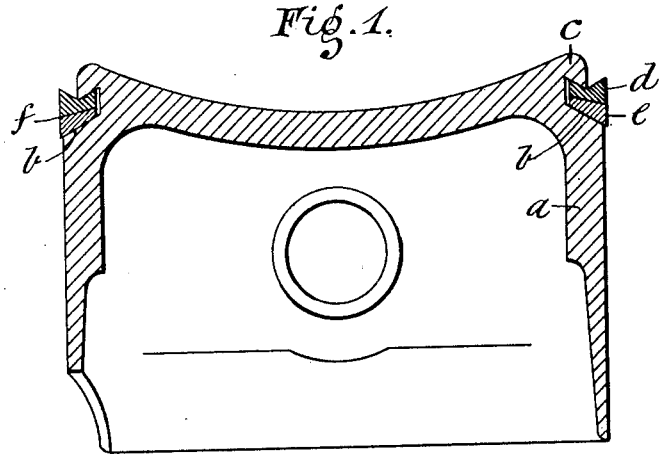
Figure 2:
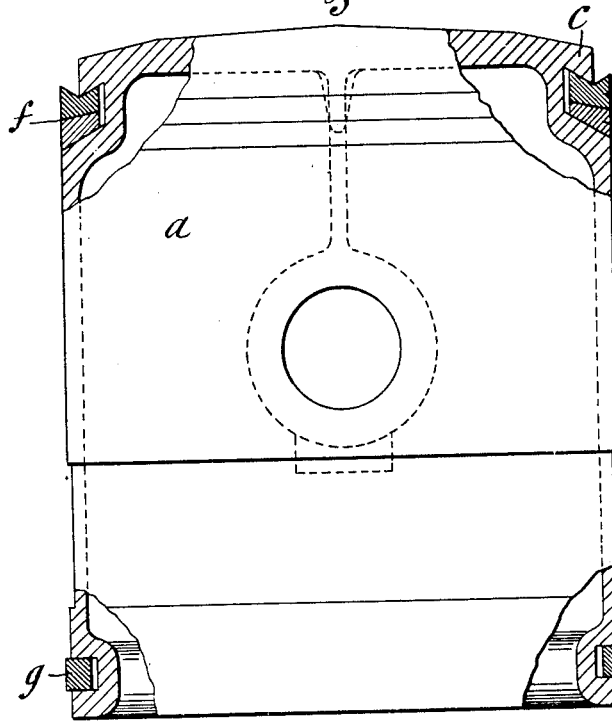
Figure 3:
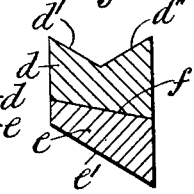
Figure 4:
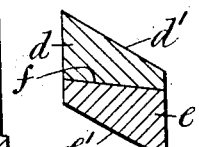

Figure 1 is a sectional elevation of the well-known "Le Rhône" engine piston; Fig. 2, is an elevation, part section of another form of piston; Fig. 3, is a sectional elevation on an enlarged scale of the preferred form of piston ring, and Fig. 4, is a similar view of the simpler form of circumferentially divided ring.

According to the present invention a circumferentially divided ring of rhombus or rhomboid section is arranged to be inserted in a corresponding groove, such groove being inclined or oblique to the axis of the piston. The divided halves of the piston ring are in the rhombus section separated along a face which in the preferred construction is parallel with neither of the longer walls of the rhomboid. The inclination of the rhomboid is inward of the piston toward the top or head of the piston so that the pressure of the compressed mixture or of the explosion will tend to force the two portions of the piston ring downward upon their respective inclined seatings and consequently radially outward against the cylinder wall.

Preferably the half of the piston ring nearer to the top of the piston is on its face nearer to the top of the piston, formed to an obtuse angle. Thus the shape of the rhombus or rhomboid is departed from, and this forward face of the piston ring is inclined first in one direction to fit the corresponding portion of the groove in the piston and then in the other direction to form the obtuse angle and this latter inclined portion extends beyond the groove in the piston, and the piston trunk is of narrower diameter here than at the other end of the piston ring slot.

By forwardly inclining the face of the forward part of the piston ring the surface of the ring in contact with the cylinder wall can be increased to such predetermined area as may be desired to deal with surface pressure and wear.

By means of this improved divided piston ring it is possible to employ only a single divided ring in a single slot instead of as usual a number of piston rings in separate slots in the piston.

Upon the accompanying sheet of drawings I have shown, by way of example, the application of my improved piston ring to two forms of pistons for explosion engines.

The piston $a$ of Fig. 1 is shown provided with an obliquely inclined groove $b$. The improved divided piston ring, see Fig. 4, is composed of two parts $d$ $e$ of rhombus or rhomboid section, the faces $d'$ and $e'$ being parallel to each other. These parts are circumferentially divided or separated along a face $f$ which is preferably not parallel to either the face $d'$ or the face $e'$ and the arrangement is such that the ring portion $d$ can slide upon the portion $e$ in an oblique recess. The pressure of the explosion (or of the compressed medium in the case of a pumping action) will force the upper portion of the piston radially outward against the cylinder. The piston head is preferably narrower in diameter than the trunk of the piston and such reduced portion is shown at $c$.

Instead of making the composite piston ring of rhomboid shape, I prefer (see Fig. 3) to form the upper half of the divided piston ring $d$ with an upwardly inclined face $d''$, which face forms with the face $d'$ an obtuse angle. The portion $d''$ is outside the groove $b$ in the piston $a$. This upwardly inclined face $d''$ is employed in the preferred form because it permits the area of the surface in contact with the cylinder wall to be correctly proportioned to the surface pressure and wear, the object being so to distribute the wear upon the upper and lower portions of the ring as to insure that the upper moves outward when worn, this movement being sufficient to permit the radial movement of the dovetail section in the groove to take up automatically any wear of the ring or groove in an axial direction.

This composite or divided piston ring is self-compensating for wear inasmuch as the one portion of the ring will slide outwardly from the oblique recess upon the other portion of the ring. It may be made of cast iron, chrome nickel steel or other suitable material.

Although shown as not parallel with $d'$ and $e'$, I wish it to be understood that the face $f$ might be made parallel thereto.

In Fig. 2, I have shown a scraper or bearing ring $g$ of ordinary construction.

The meeting ends of the improved ring $d$ $e$ may be inclined or cross cut and overlap in the usual manner. In arranging the improved ring in place in its groove or recess $b$, both portions must be inserted together or the upper portion first.

The divided piston ring operating in an oblique recess has been proved to be of great utility and usefulness over any divided piston ring operating in a plain right angle recess cut in pistons of previous manufacture.

I claim:

1. A piston ring of superimposed sections, that portion of the ring engaging the piston groove being inclined with respect to the horizontal, the meeting faces of the sections being similarly inclined but at less angle to the horizontal.

2. A piston ring of superimposed sections, having their meeting faces at an angle to the horizontal, the lower face of the lower section being inclined to the horizontal, the upper face of the upper section having two angularly related portions both inclined to the horizontal.

3. A piston ring comprising superimposed sections with their meeting faces at an inclination to the side walls of the sections, the upper surface of the upper section having two angularly related portions, both at an inclination to the side walls, and the lower surface of the lower section having an inclination to the side wall greater than that of the meeting surface.

PHILIP CHALLIS.